No. 716,550. Patented Dec. 23, 1902.
E. INNESS & I. P. HAZARD.
G. INNESS, Jr., Administrator of E. INNESS, Dec'd.
SPEED CHANGING DEVICE.
(Application filed Feb. 28, 1902.)
(No Model.) 3 Sheets—Sheet 2.
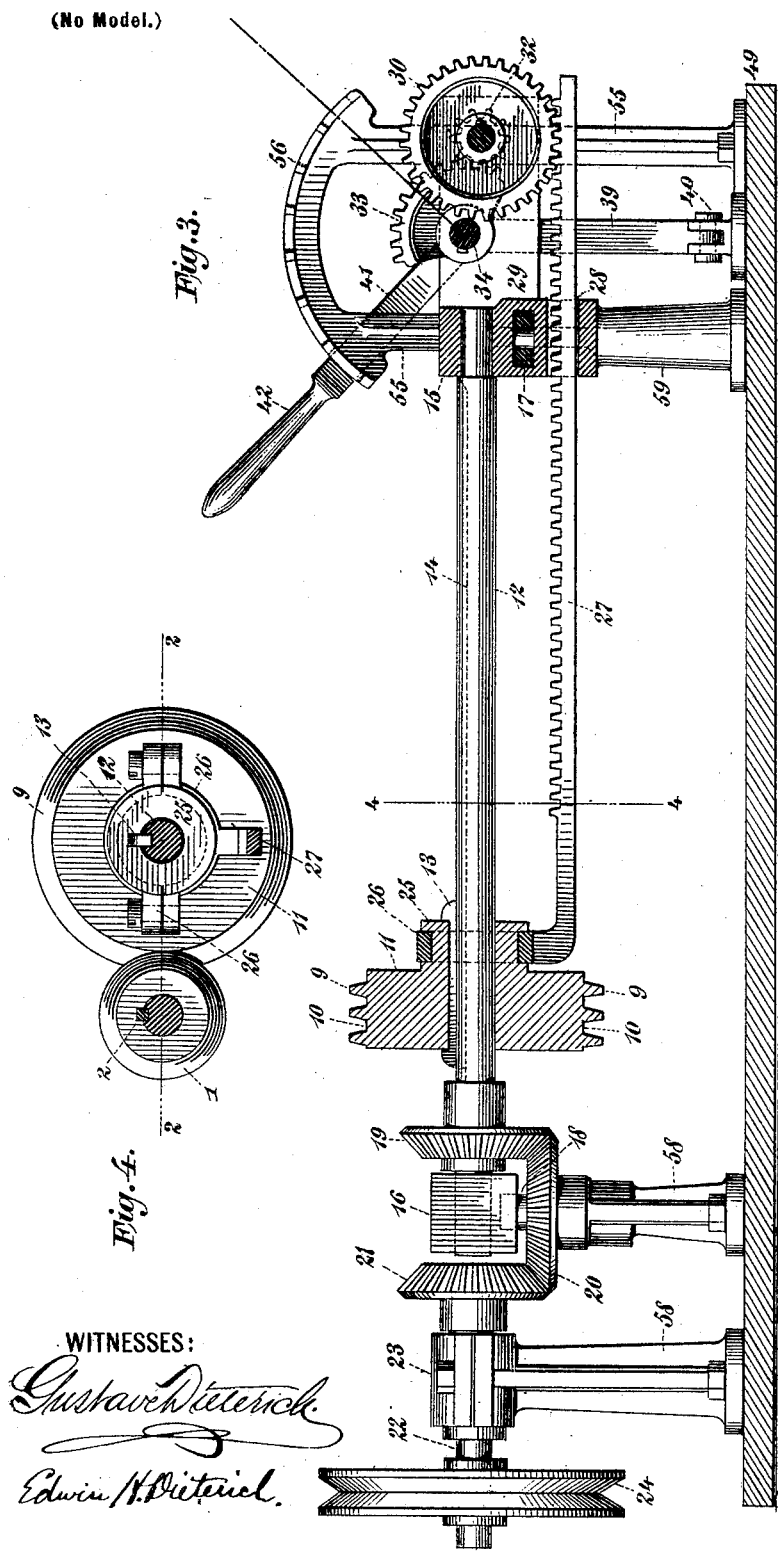
WITNESSES:
INVENTORS
George Inness, Jr. Administrator
of Estate of Ellsworth Inness.
I. Peace Hazard.
BY
ATTORNEY

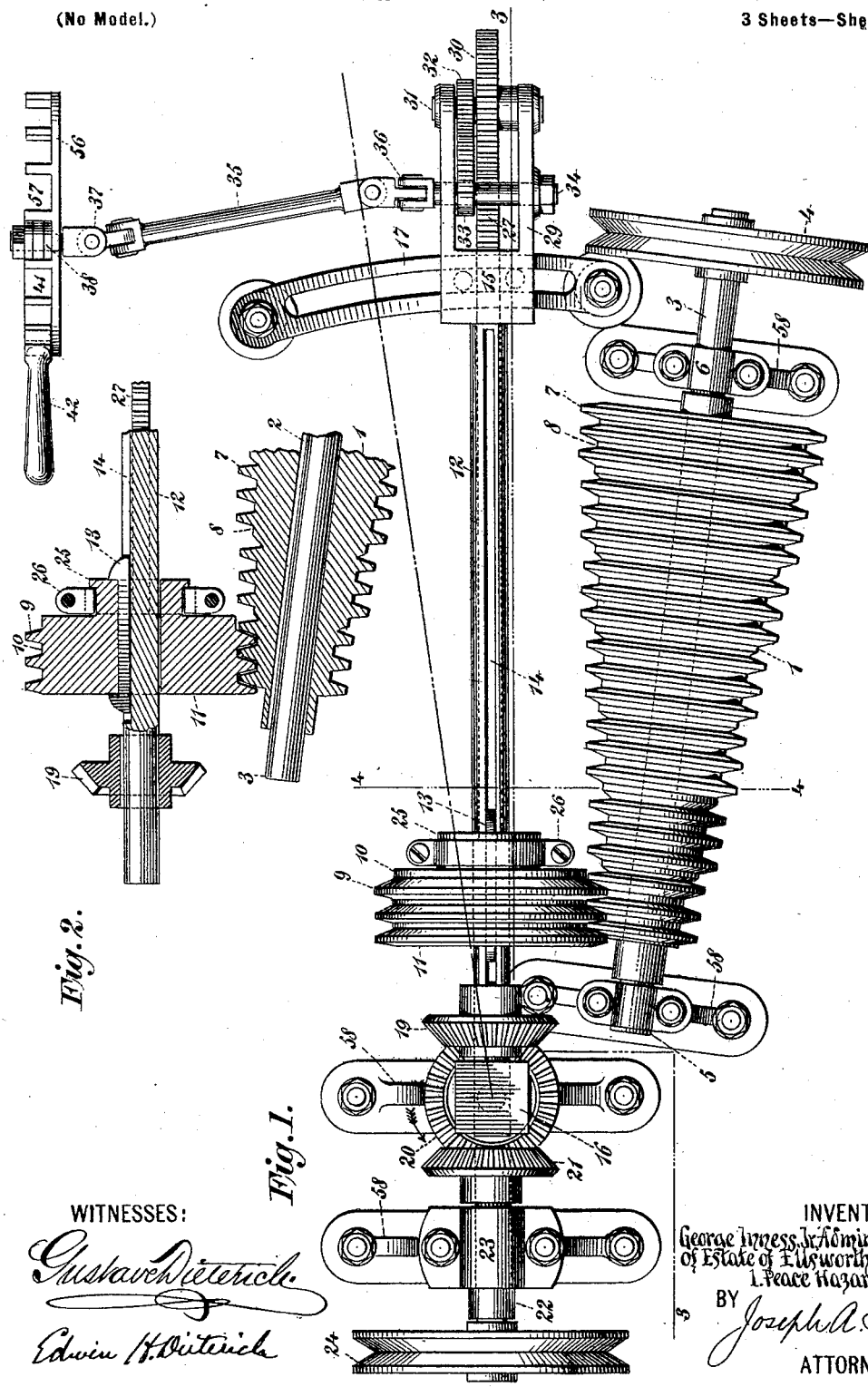

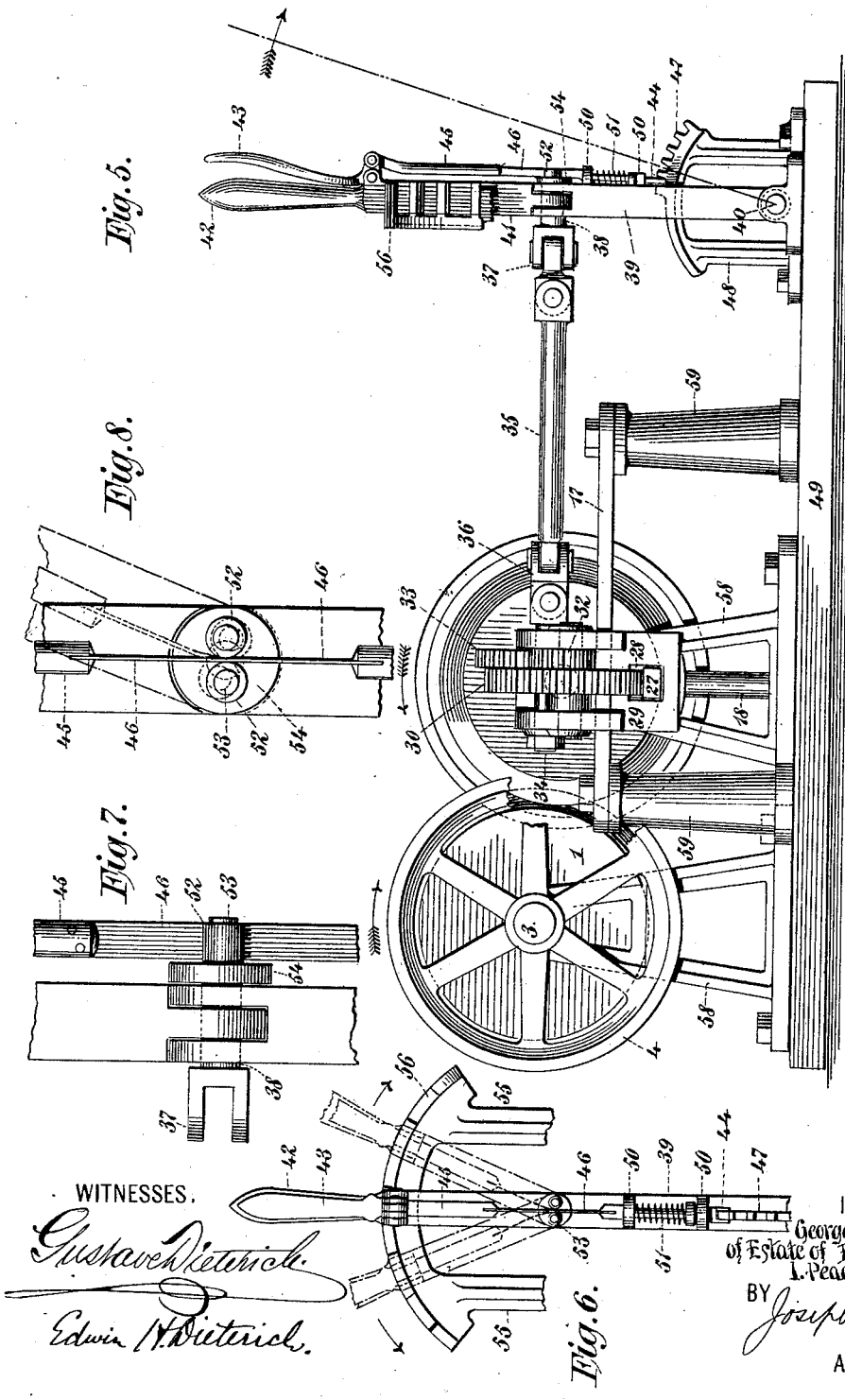

UNITED STATES PATENT OFFICE.

GEORGE INNESS, JR., ADMINISTRATOR OF ELLSWORTH INNESS, DECEASED, OF MONTCLAIR, NEW JERSEY, AND ISAAC PEACE HAZARD, OF PEACEDALE, RHODE ISLAND.

SPEED-CHANGING DEVICE.

SPECIFICATION forming part of Letters Patent No. 716,550, dated December 23, 1902.

Application filed February 28, 1902. Serial No. 96,117. (No model.)

*To all whom it may concern:*

Be it known that we, ELLSWORTH INNESS, deceased, late a citizen of the United States, residing at Montclair, in the county of Essex and State of New Jersey, and ISAAC PEACE HAZARD, a citizen of the United States, residing at Peacedale, in the county of Washington and State of Rhode Island, have invented new and useful Improvements in Speed-Changing Devices, of which the following is a specification.

This invention relates to an improved device for changing speed and is adapted for use in many mechanisms—such as hoisting-machines, motor-carriages, seeding-machines, and grain-drills—where an easy and convenient method of changing speed is desired.

Important features of the invention consist in its practicability in changing speed without stopping while the mechanism is in operation and by the control of a single lever.

The invention consists of a driving-shaft carrying a number of rings or wheels of gradually-diminishing diameter, like a cone, from which power is transmitted to a ring or wheel carried on a driven shaft at an angle to the driving-shaft, one end of the driven shaft having its bearing in a movable frame, together with devices for shifting the frame to and from the driven shaft and the ring or wheel along the driven shaft, so that it may engage with the desired portion of the cone on the driving-shaft, all the shifting devices being under the control of a single operating-handle.

Figure 1 of the drawings is a plan view showing the wheel on the driven shaft in engagement with the smallest section of the driving-cone. Fig. 2 is a view, partly in section, on the line 2 2 of Fig. 4. Fig. 3 is a side view, partially in section, on the line 3 3 of Fig. 1. Fig. 4 is section on line 4 4 of Fig. 3 looking toward the left. Fig. 5 is an end view showing the mechanism for shifting the gear. Fig. 6 is a side view of said mechanism. Fig. 7 is an enlarged end view of the roller-guides for the spring-catch. Fig. 8 is an enlarged side view of the same.

In the drawings, 1 is the driving-cone, rigidly secured by the key or spline 2 upon the driving-shaft 3, which is actuated by power applied to the pulley 4. The shaft 3 is carried in the bearings 5 and 6, Fig. 1. The cone 1 is shown as consisting of seven sections, increasing in size from left to right; but more or less sections of varying diameter might be employed. Each section has three rings or flanges 7 projecting from the base 8 of the section. These flanges and base engage with the corresponding parts 9 and 10 of the wheel 11, Figs. 1, 2, and 3, which is carried on the driven shaft 12. The wheel 11 has a key or spline 13, and in the shaft 12 is a slot 14 to receive said spline 13, so that the wheel 11 and shaft 12 must revolve together; but the wheel 11 may be shifted along the shaft 12, as hereinafter described. The shaft 12 turns in the bearings 15 and 16. The bearing 15 may be moved along the track 17, Fig. 1, but has no up-and-down movement from said track. The bearing 16 is pivoted at 18, so that the shaft 12 may be shifted to and from the cone 1 on the track 17 and center 18. Fixed to the pivoted end of the shaft 12 is the bevel-gear 19, which meshes with the bevel-gear 20 on the center 18, which in turn meshes with the bevel-gear 21 on the shaft 22, journaled at 23. From the shaft 22 the power is taken from pulley 24 or otherwise to drive whatever mechanism the invention is applied to.

The position of the shaft 22 may be varied so that it is parallel with shaft 3, or it may extend in any convenient direction from the bevel-gear 20, which may be toothed on the under side.

Encircling the flange 25 of engaging wheel 11 is the collar 26, which is secured to the toothed rack 27, Fig. 3. The rack 27 extends through the slot 28 in the frame 29 beneath the bearing 15 in said frame. Rack 27 meshes with gear-wheel 30, journaled in frame 29, which extends from bearing 15 and moves therewith. Secured to the shaft 31 of gear-wheel 30 is the smaller gear-wheel 32, Figs. 3 and 5, which meshes with the toothed sector 33, secured to the shaft 34, journaled in frame 29. The rod 35 is connected with the shaft 34 by the universal joint 36. The other end of rod 35 is connected by the universal joint 37 to the pin 38, which is carried in bearings at the upper end of the lever 39, Figs. 5 and 7, which is pivoted at 40. Secured to pin 38 between its bearings in the upper end of lever 39 is lever 41, having the handle 42 and the grip 43, Fig. 5, which controls the spring-pressed catch 44 through the medium of the rod 45 and steel ribbon 46, Figs. 5 and 6. The catch 44 engages the teeth 47, whose frame 48 is secured to the base 49. The catch 44 has the guides 50, Fig. 6, and expanding-spring 51, tending to keep it in engagement with teeth 47 unless withdrawn by grip 43. The steel ribbon 46, connecting catch 44 with rod 45, is guided between two rollers 52, Figs. 7 and 8, on pins 53, projecting from plate 54 on pin 38. The uprights 55 support the curved frame 56 with seven apertures or sockets 57 for the reception of lever 41. The various parts of the device are supported on the base 49 by castings 58. The track 17 is secured to posts 59.

The operation of the device is as follows: The driving-cone 1 revolves under the application of power to pulley 4 in the direction of the arrow in Fig. 5. The wheel 11 is held in engagement with one of the sections of cone 1 by the bearing 15, which is held in its innermost position by the retention by catch 44 of lever 41 in a socket 57. When the lever 41 is in one of said sockets 57, lever 39 is kept to the left, Fig. 5, holding through the medium of pin 38, rod 35, and frame 29 the bearing 15 of shaft 12 in the position of engagement shown in Fig. 1. If it is desired to vary the speed of the shaft 22, the operator by means of grip 43 withdraws catch 44 from engagement and shifts handle 42 to the left, Fig. 5, turning lever 39 on its pivot 40 until shaft 12 reaches the position indicated by dotted line in Fig. 1, when wheel 11 will be disengaged and freed from cone 1. Grip 43 is then released, and spring-catch 44 engages an outer tooth 47, retaining the lever 39 in its outward position. The operator then shifts handle 42, which is free from the sockets 57, from left to right, Fig. 3, or from right to left, as the case may be, until the handle 42 is opposite a socket 57, corresponding to the section of cone 1, engagement with which will yield the desired speed. The shifting of wheel 11 on its shaft 12 is accomplished by this movement of handle 42, as follows: The pin 38, to which lever 41 is fast, is connected by rod 35 and universal joints 36 and 37 to the shaft 34, so that the partial revolution of pin 38 causes a corresponding movement of shaft 34 and of toothed sector 33, which is fast on shaft 34. The movement of tooth-sector 33 turns gear-wheels 32 and 30 on their shaft 31, and the rack 27, meshing with gear-wheel 30, is moved to the right or left, Fig. 3, shifting wheel 11 to the desired position for engagement with a section of cone 1. The operator then lifts spring-catch 44 and pushes handle 42 to the left, Fig. 5, into the selected socket 57, when spring-catch 44 is again released to retain the parts in operative position, the wheel 11 being in engagement with the desired section of cone 1. As pin 38 turns with the movement of lever 41, which carries grip 43 and its rod 45, the plate 54, Figs. 7 and 8, on pin 38 also shifts carrying-pins 53 and rollers 52, as indicated by dotted lines in Fig. 8. The slight bending of steel ribbon 46 when handle 42 is to the right or left, Fig. 6, will simply move grip 43 very slightly away from handle 42 without affecting spring-catch 44. Instead of steel ribbon 46 a wire or chain might be employed.

The contacting surfaces of cone 1 and wheel 11 may be made of any desired material—as, for instance, metal or rawhide. The shape of the sections of cone 1 and wheel 11 may be varied. If desired, plain surfaces without flanges may be employed. When the mechanism is in operation, the bevel-gear 20 is revolved in the direction indicated by the arrow, Fig. 1, and has a tendency to force the shaft 12 and the wheel 11 toward the cone 1, so that the frictional contact between wheel 11 and cone 1 is maintained and increased as the resistance of the work performed increases.

What we claim as new, and desire to secure by Letters Patent, is—

1. In a speed-changing mechanism a shaft, a cone with sections of varying diameter permanently secured to said shaft, a wheel adapted to engage a selected section of said cone, a shaft for said wheel at an angle to the shaft of said cone, a frame carrying one of the bearings of the shaft for said wheel, a toothed rack parallel with the shaft of said wheel and having one end connected thereto, the other end extending through the said frame, an operating-handle, and devices for shifting said frame to and from said cone and said toothed rack in and out to accord with the selected section of the driving-cone, the movement of said frame and said tooth-rack being under the control of said single operating-handle.

2. In a speed-changing device a driving-cone in fixed bearings, a driven shaft adapted to be shifted on a pivoted bearing to and from the driving-cone, a wheel provided with a flange carried on the driven shaft and adapted to be engaged with a selected section of the driving-cone, a movable frame, a toothed rack having one end encircling a flange on said wheel the other extending through said movable frame, a bearing for the driven shaft in said frame, gear carried on said frame whereby the toothed rack may be shifted in and out, and an operating-handle movement of which in one plane engages and disengages said wheel from the driving-cone while movement in another plane turns the gear to shift the toothed rack and wheel along the driving-cone to the selected section of the driving-cone.

3. In a speed-changing device a driving-cone, a driven shaft with one of its bearings pivoted, a frame carrying the other bearing, a track on which said frame is shifted, an engaging wheel on the driven shaft, a toothed rack extending through said frame and having one end connected to the engaging wheel, a gear engaging said toothed rack and carried in said frame, and means whereby said frame may be moved to and from the driving-cone and said gear operated to shift the toothed rack so that the engaging wheel may be moved to a selected position.

In testimony whereof we have signed our names to this specification in the presence of two subscribing witnesses.

GEORGE INNESS, JR.,
*Administrator of the estate of Ellsworth Inness.*

I. PEACE HAZARD.

Witnesses to G. I., Jr.:
CAELVARD NORTON SMITH,
THOMAS BROWNE.

Witnesses to I. P. H.:
JOSEPH E. MARVIN,
BASIL J. ROWE.